(12) United States Patent
Cuddihy et al.

(10) Patent No.: US 8,504,770 B2
(45) Date of Patent: Aug. 6, 2013

(54) SYSTEM AND METHOD FOR REPRESENTATION OF TARGET DEVICES IN A STORAGE ROUTER

(75) Inventors: David J Cuddihy, Hamburg, NY (US); Christopher M Kalisiak, North Tonawanda, NY (US); David A Snell, Youngstown, NY (US)

(73) Assignee: Atto Technology, Inc., Amherst, NY (US)

( * ) Notice: Subject to any disclaimer, the term of this patent is extended or adjusted under 35 U.S.C. 154(b) by 212 days.

(21) Appl. No.: 13/227,350

(22) Filed: Sep. 7, 2011

(65) Prior Publication Data
US 2012/0059991 A1    Mar. 8, 2012

Related U.S. Application Data

(60) Provisional application No. 61/402,900, filed on Sep. 7, 2010.

(51) Int. Cl.
*G06F 12/00*   (2006.01)

(52) U.S. Cl.
USPC ...................................................... 711/114

(58) Field of Classification Search
None
See application file for complete search history.

(56) References Cited

U.S. PATENT DOCUMENTS

| | | | |
|---|---|---|---|
| 6,920,494 B2 | 7/2005 | Heitman et al. | |
| 7,197,606 B2 * | 3/2007 | Kobayashi et al. | 711/147 |
| 7,240,098 B1 * | 7/2007 | Mansee | 709/212 |
| 7,430,593 B2 | 9/2008 | Baldwin et al. | |
| 7,437,477 B2 * | 10/2008 | Kuik et al. | 709/238 |
| 7,522,616 B2 * | 4/2009 | Thompson | 370/401 |
| 7,657,613 B1 | 2/2010 | Hanson et al. | |
| 7,730,210 B2 * | 6/2010 | Kuik et al. | 709/245 |
| 7,774,444 B1 | 8/2010 | George et al. | |
| 8,015,339 B2 * | 9/2011 | Hoese et al. | 710/305 |
| 2005/0071482 A1 | 3/2005 | Gopisetty et al. | |

OTHER PUBLICATIONS

E.K. Lee and C.A. Thekkath, Petal: Distributed Virtual Disks, The Proceedings of the 7th International Conference on Architectural Support for Programming Languages and Operating Systems, 1996, pp. 1-9, Republished by Digital Equipment Corporation, Palo Alto, California, US.

* cited by examiner

*Primary Examiner* — Hiep Nguyen
(74) *Attorney, Agent, or Firm* — Phillips Lytle LLP

(57) ABSTRACT

The present invention provides an improved device, system and method for representation of target devices in a storage router. In one aspect, a device, system and method are provided for predictive representation of SAS/SATA-based target devices in a storage router corresponding to the physical layout of the target devices. In another aspect, a storage router is communicatively connectable to a plurality of target storage devices. In one embodiment, a router discovery manager or module is configured to discover the physical layout of the target storage devices; a host system interface receives and responds to data storage commands; a computer bus interface connects/communicates with SAS and SATA storage; and a plurality of host system interface to target storage device maps correspond to the physical layout of the target storage devices.

28 Claims, 4 Drawing Sheets

SYSTEM AND METHOD FOR REPRESENTATION OF TARGET DEVICES IN A STORAGE ROUTER

PRIORITY CLAIM

The present application claims priority to U.S. Provisional Patent Application No. 61/402,900, filed Sep. 7, 2010.

BACKGROUND OF THE INVENTION

In a network environment, data generated by a workstation may be stored on a remote device. The data storage device is connected to the workstation by a network that is external to the workstation and may be used by a number of devices. A Storage Area Network, hereafter referred to as a "SAN", consists of initiators, typically workstations or servers, and targets, such as a disk drive array or tape library. Each component of a SAN has an address which allows network storage traffic to be routed to and from the appropriate end nodes.

SANs may comprise a number of Serial Attached SCSI (SAS)-based or Serial Advanced Technology Attachment (SATA)-based target devices. The computer bus interface for connecting to SAS and SATA storage is referred to collectively herein as "SAS/SATA." SAS and SATA-based target devices, including without limitation disk drives, tape drives, solid-state drives, optical storage and protocol expanders, may be connected to a SAN via a storage router which provides protocol translation and target device aggregation. Storage routers, also commonly known as protocol bridges or gateways, are responsible for mapping target devices into the SAN namespace in order to provide seamless connectivity between initiators and targets.

On the SAN, the storage router exposes a number of targets, each target having one or more Logical Units (LUNs). LUNs can represent a single physical device or a logical device created by the concatenation of storage from several different physical devices. A target identifier uniquely identifies each target on the SAN. Some examples of target addresses are Fibre Channel worldwide name (WWN), iSCSI Qualified name (iQN) or Infiniband EUI-64. Mapping of physical devices to SAN target identifier and LUN identifier is the responsibility of the storage router, and may be configured manually by the user or automatically by the storage router.

SAS and SATA target devices are often housed in physical enclosures along with a SAS expander. A SAS expander communicates with multiple SAS devices, allowing a single initiator port to connect with multiple SAS targets. Target devices in the enclosure are identified by a slot number known to the SAS expander. The storage router, acting as a SAS initiator, can discover the target's slot number by querying the expander using the Serial Management Protocol (SMP) or SCSI Enclosure Services (SES).

BRIEF SUMMARY OF INVENTION

Merely for purposes of illustration and not by way of limitation, the invention broadly comprises a system, method and mechanism within a storage router for establishing a mapping affinity among target devices (e.g. SAS and SATA-based target devices) contained within a physical enclosure. In one aspect, a mapping affinity simplifies user configuration of router-attached storage by automatically grouping physically co-located target devices for presentation to the user.

In one aspect, the invention provides a storage router communicatively connectable to a plurality of target storage devices, comprising a router discovery module configured to discover the physical layout of the target storage devices; a host system interface for receiving and responding to data storage commands; a computer bus interface for connecting to SAS and SATA storage ("SAS/SATA" interface); and a plurality of host system interface to target storage device maps corresponding to the physical layout of the target storage devices. In another aspect of the storage router, target storage devices are contained in a plurality of storage enclosures which are configured to report an enclosure identifier and to report the physical layout of the target storage devices by means of an associated characteristic parameter. In another aspect, the target storage device maps are grouped by the storage enclosure identifier and ordered by the associated characteristic parameter, which may be a target device slot number or target PHY identifier. In certain aspects, an empty target device map is provided to account for one or more gaps in the associated characteristic parameter. In yet another aspect, the storage enclosure comprises a SCSI processor device configured to respond to a SCSI RECEIVE_DIAGNOSTIC_RESULTS command with a list of PHY identifiers, wherein the characteristic parameter is target PHY identifier. In another aspect, the storage router is a component of a SAS/SATA host bus adaptor installed in an initiator work station, and in yet another aspect, the target storage device maps are stored in nonvolatile storage. The storage router, together with a plurality of target storage devices, comprise a storage router system.

In one aspect of the invention, target storage devices are configured with SMP-based zone identifiers; and the storage router is configured to discover the zone identifiers and the physical layout of the target storage devices to create a virtual enclosure for each zone identifier with a corresponding virtual enclosure identifier, and to create target device maps corresponding to the physical layout and the zone identifiers. Target device maps, zone identifiers and virtual enclosure identifiers may be stored in nonvolatile storage. In another aspect, target storage devices are contained in a plurality of storage enclosures, and the storage enclosures are configured to report SMP-based zone identifiers and to report the physical layout of the target devices by means of an associated characteristic parameter.

In addition, the storage router may comprise a PCIe interface for communicating with the target storage devices, together with any of the foregoing.

A method is also provided for mapping target storage devices in a storage router system comprising one or more of the following steps: providing a host system interface for receiving and responding to data storage commands; providing a plurality of target storage devices; discovering the physical layout of the target storage devices; creating a plurality of host system interface to target storage device maps corresponding to the physical layout of the target storage devices; providing nonvolatile storage; writing the storage device maps to nonvolatile storage; providing a plurality of storage enclosures configured to report an enclosure identifier and to report the physical layout by means of an associated characteristic parameter; querying the storage enclosures to report the enclosure identifier and the associated characteristic parameter(s); analyzing characteristic parameter(s) for gaps in order; creating empty storage device map(s) to account for such gap(s).

DESCRIPTION OF THE PREFERRED EMBODIMENTS

Figure 1:
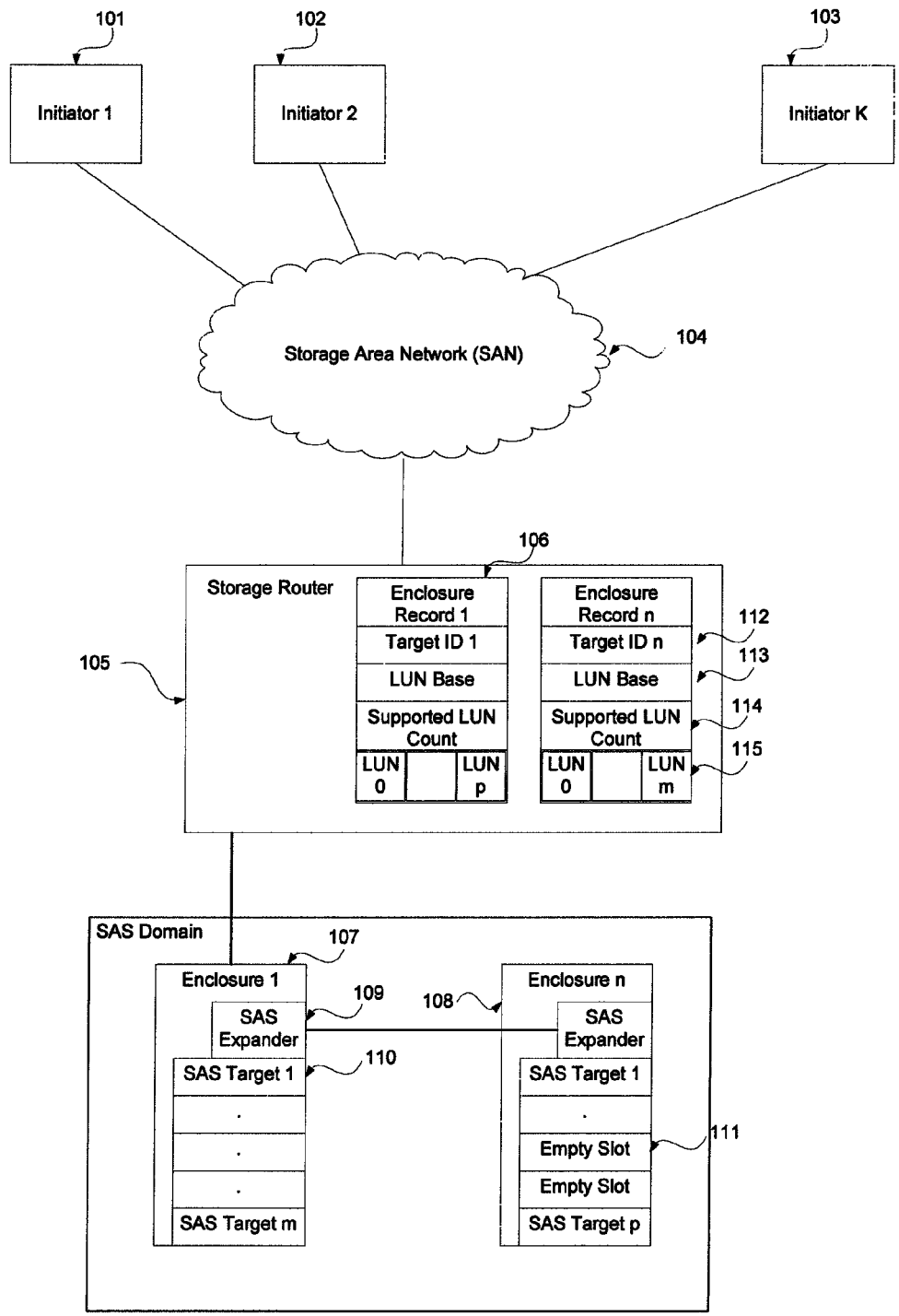
FIG. 1 is a diagram of a storage router in a SAN environment.

At the outset, it should be clearly understood that like reference numerals are intended to identify the same parts, steps, elements or portions consistently throughout the several drawing figures, as such parts, steps, elements or portions may be further described or explained by the entire written specification, of which this detailed description is an integral part. The following description of the preferred embodiments of the present invention are exemplary in nature and are not intended to restrict the scope of the present invention, the manner in which the various aspects of the invention may be implemented, or their applications or uses.

One embodiment comprises a system and method for implementing storage router mapping from SAS and SATA-based target devices into the SAN namespace. Certain characteristics of target devices like enclosure identification, zone, physical location and SAS expander topology, for example, may be identified and managed by an initiator. In one aspect, a storage router contains as a component a discovery module responsible for determining these target device characteristics. The storage router creates a unique device identifier for each storage enclosure discovered in the SAS/SATA storage domain. During device discovery, the discovery module queries each discovered SAS expander for details of the enclosure in which it is installed. Target devices reported by the expander are assigned to the enclosure's unique target identifier and given LUN identifiers corresponding to the target device's reported slot number. This mapping establishes an affinity among co-located target devices. If the expander reports an empty slot, that LUN identifier is reserved by the storage router for future expansion. Once target discovery has completed, the target and LUN maps are saved in the storage router's persistent storage. In this way, a consistent view of the storage can be preserved across storage router power-cycles, resets or re-cabling. In one embodiment, expanders which are not directly connected to storage targets are not mapped into the SAN namespace. If target devices outside of an enclosure are discovered, a virtual enclosure is created within the storage router to preserve mapping for the stand-alone target. Less sophisticated storage enclosures which do not report slot information may be treated similarly.

FIG. 1 illustrates a number K of initiator workstations 101,102,103 which are connected to a SAN 104. A storage router 105 is connected between the SAN and a number n of SAS enclosures 107,108. In this embodiment, each enclosure has at least one SAS expander 109 and a number of SAS targets 110. An enclosure may have drive slots which are empty 111. The storage router creates an enclosure record 106 for each enclosure discovered in the SAS domain 120. Each enclosure record has corresponding target identifier 112 and LUN identifier 115 used to map the SAS devices into the SAN namespace. In this embodiment, enclosure records also contain information to assist with LUN identifier assignment during discovery. The LUN base 113 stores the lowest numbered LUN identifier within this enclosure and the supported LUN count 114 stores the number of LUNs supported by the enclosure.

Figure 2:
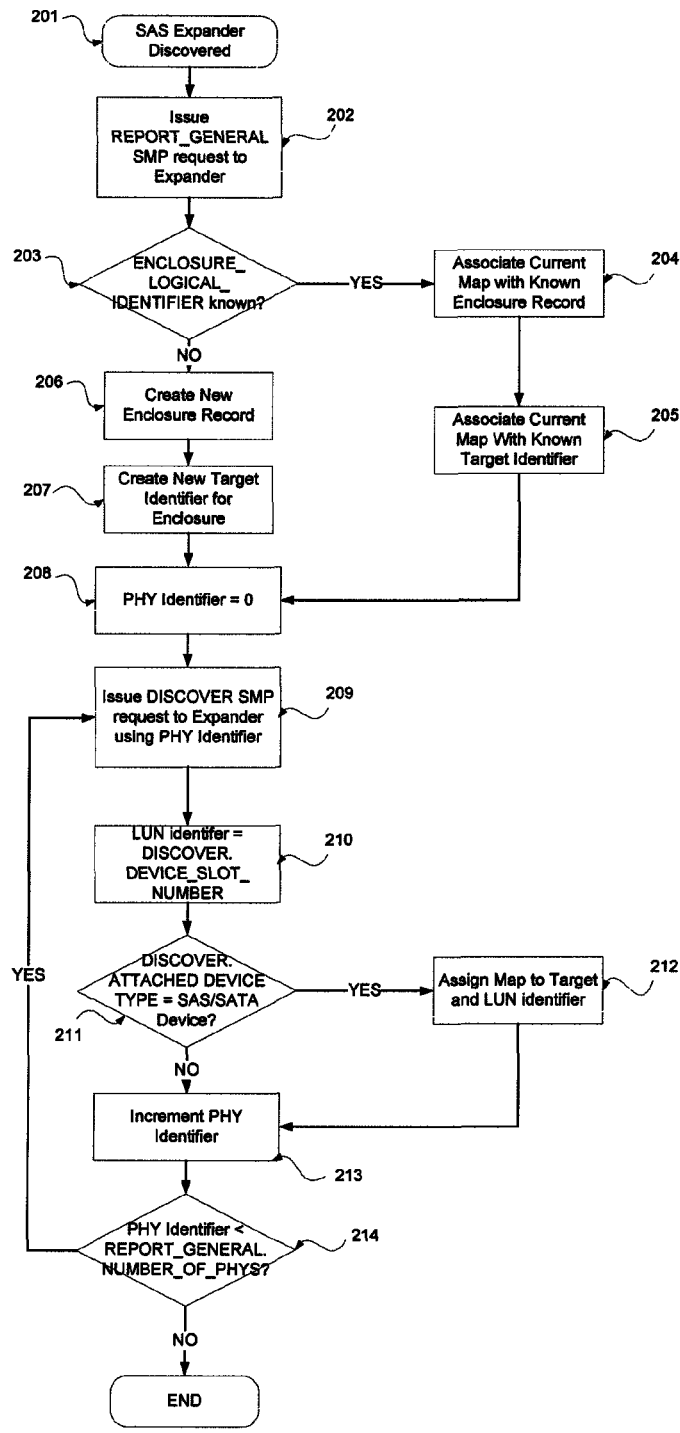
FIG. 2 is a flow chart illustrating one embodiment of a target discovery algorithm.

The target discovery process is illustrated in the flow chart of FIG. 2. A SAS expander is discovered 201 during the normal SAS target discovery process. In this embodiment, the SAS expander is part of a drive enclosure and capable of relaying enclosure properties. A REPORT_GENERAL SMP request 202 is issued to the expander. At 203, the corresponding REPORT_GENERAL SMP response is examined to determine if the ENCLOSURE LOGICAL IDENTIFIER reported by the expander is associated with a target device previously mapped by the storage router. If the identifier has been previously discovered, the stored enclosure record is retrieved from the storage router's nonvolatile storage 204 and the current target identifier is used for this discovery 205. If the ENCLOSURE LOGICAL IDENTIFIER is unknown by the storage router, a new enclosure record and target identifier are created 206,207 to be used in the creation of a new device map on the SAN.

In this embodiment, a local loop variable known as the PHY identifier is initialized 208 and a series of DISCOVER SMP requests are issued to the expander 209. The DISCOVER SMP response contains a DEVICE SLOT NUMBER field, which is validated and assigned into a temporary LUN identifier variable 210 (Field validation and error handling, which are present in a preferred embodiment of the algorithm, are not illustrated for purposes of clarity). The expander may return responses for PHY identifiers without a physical target attached, for example an empty slot or an expander-to-expander connection. At 211, if a physical target is reported, a map is created between the physical device and the target and LUN identifier 212. The PHY identifier is then incremented and the discovery is issued for every device reported by the expander (steps 213 and 214).

Once SAS discovery has completed, the storage router will write the map data into nonvolatile storage, preserving target identifier and LUN assignments in case of power loss or target device failure and SAS rediscovery. In one embodiment, if target devices are permanently removed from the SAS domain, the associated maps can be deleted by a user via any one of the storage router's management interfaces, including serial command line interface, storage router front panel, telnet command line or graphical user interface.

In another embodiment, the storage router creates a single target for all logical units discovered in the SAS domain. LUN identifiers are grouped by storage enclosure and ordered by slot number. Any unoccupied slots within an enclosure create gaps in the LUN identifier list so that the addition of target devices to these enclosures will not force other LUN identifiers to change.

Figure 3:
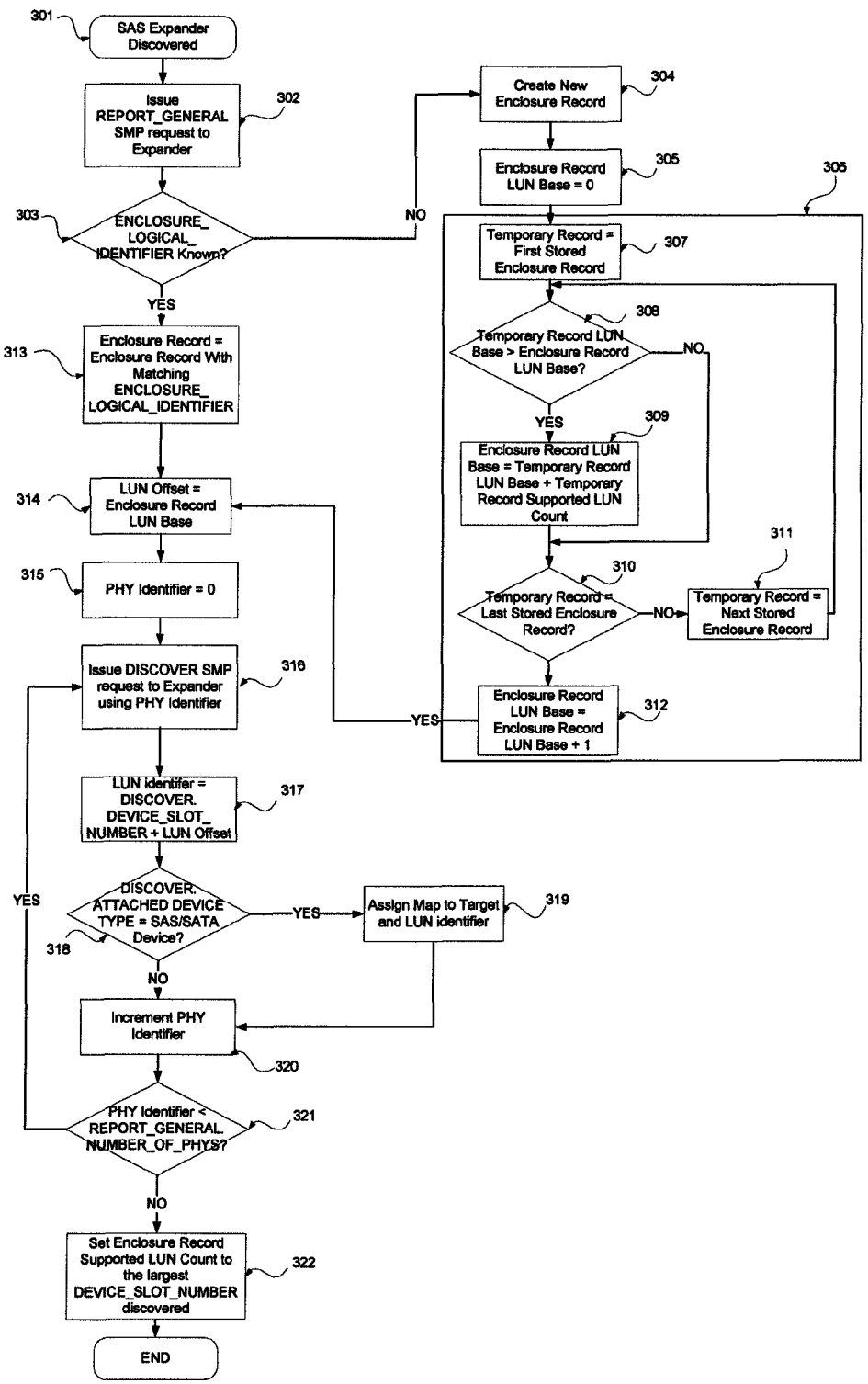
FIG. 3 is a flow chart illustrating one embodiment of a target discovery algorithm whereby a single target identifier is exposed to a SAN for all enclosures discovered.

The target discovery process for this embodiment is illustrated in the flow chart of FIG. 3. A SAS expander is found during the discovery process 301 and a REPORT_GENERAL SMP request is issued to the expander 302. If the ENCLOSURE_LOGICAL_IDENTIFIER within the REPORT_GENERAL response matches a stored ENCLOSURE_LOGICAL_IDENTIFIER 303, the matching enclosure record is retrieved from the storage router memory and used for the remainder of this algorithm 313. If the ENCLOSURE_LOGICAL_IDENTIFIER is not recognized a new enclosure record is created 304. The LUN base for the new enclosure record is then calculated 305,306 by looping through all stored enclosure records and assigning a value one more than the highest possible LUN value for all known enclosures (steps 307 through 312).

Once the LUN offset is known at 314, each PHY on the expander is initialized 315 and queried via a DISCOVER SMP request 316. At 317, the LUN identifier is assigned by adding the LUN offset to the slot number reported by in the DISCOVER SMP request. If the reported device type 318 indicates that a SAS or SATA target is attached to the PHY, a map is created between the physical device and the LUN identifier 319. The PHY identifier is then incremented and the discovery is issued for every device reported by the expander (steps 320 and 321). Once discovery has completed on this expander, the supported LUN count stored in the enclosure record is set equal to the highest valid DEVICE_SLOT_NUMBER reported by the expander 322.

SES defines a generic method for SCSI enabled enclosures to report slot number and slot status within an enclosure. The SCSI RECEIVE_DIAGNOSTIC_RESULTS command can report Enclosure Status diagnostic page with element descriptors for each slot in the enclosure. In another embodiment, the storage router, during discovery but before mapping, issues SCSI Enclosure Services to the enclosure to be mapped. The RECEIVE_DIAGNOSTIC_RESULTS command returns a PHY descriptor list which is then correlated with the PHY identifier used by the SMP discover message, and contains slot number and target type information similar to the SMP discover command.

In another embodiment, the storage router can use the PHY identifier issued in the SMP DISCOVER request to establish LUN identifiers for mapping. Mapping would be identical to SMP-based mapping discussed above, but the PHY identifier and NUMBER_OF_PHYS would replace the reported DEVICE_SLOT_NUMBER when calculating LUN identifiers.

Other target characteristics can also be used to establish drive affinity. In one embodiment, for example, SMP-based zoning information can be used in such a way that devices belonging to the same zone group are mapped to one virtual enclosure while another zone group has its targets mapped to a different virtual enclosure. Enclosure records can also be created for all devices with identical zone permissions or devices controlled by the same zone manager.

In another embodiment, target devices are mapped to different virtual enclosures based on whether they are communicating using SAS versus SATA protocols.

In another embodiment, target devices communicate with the storage router using the Peripheral Component Interface Express (PCIe) interface as a transport mechanism for SCSI commands. In one aspect, PCIe-based target devices report an enclosure identifier and corresponding target device slot number. LUN or target identifiers are then grouped by storage enclosure and ordered by slot number.

Figure 4:
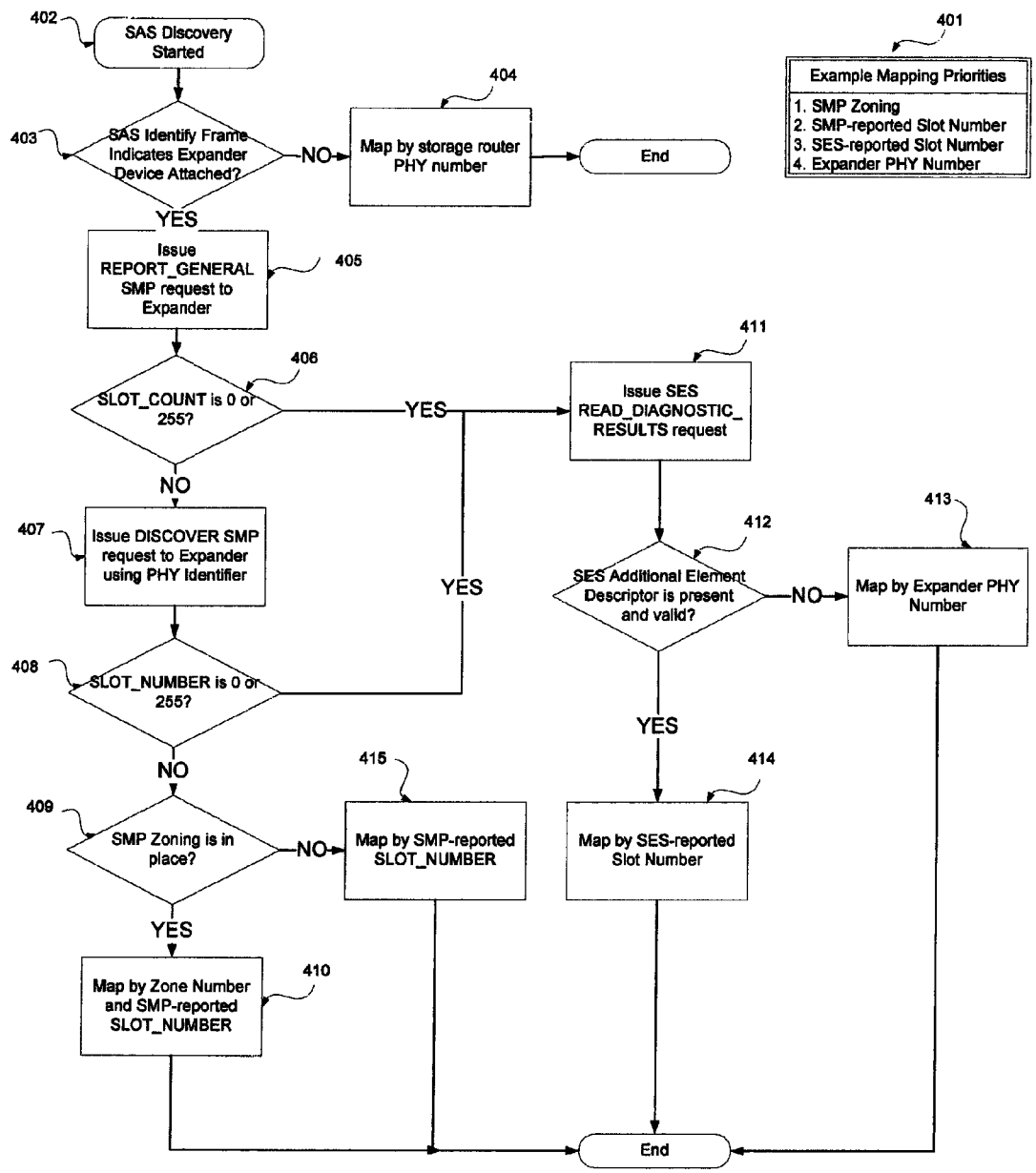
FIG. 4 is a flow chart illustrating one embodiment of a mapping algorithm prioritization scheme.

Storage routers may be installed in heterogeneous environments and the storage router logic may not receive all the information needed to establish an enclosure affinity for a particular map. In such a case, the storage enclosure can move from a most preferred to a least preferred mapping method based on the information returned by the storage during discovery. In certain embodiments, the prioritization of mapping strategies can be fixed or it can be configurable by the user of the storage array. FIG. 4 shows an example stepping from most preferred to least preferred mapping strategy.

In the flow chart shown in FIG. 4, the established priority of target affinities is shown by the table labeled 401. SMP-based Zoning is the most preferred method; followed by SMP-reported slot number, followed by SES-reported slot number, followed by expander PHY number. Upon SAS discovery 402, in the case that an expander is not present 403, the device is mapped as if it were installed in a direct-attached virtual enclosure 404. If an expander is present the REPORT_GENERAL SMP request is issued to the expander 405. If the SLOT_COUNT is valid 406 the DISCOVER SMP request is issued to the expander 407. An illegal SLOT_COUNT or SLOT_NUMBER 406,408 causes the storage router to attempt SES-based mapping 411. Successful SES mapping 412 causes the router to use SES-reported slot numbers for mapping 414. If SES based mapping fails 412 the lowest priority mapping may be used 413. If SMP slot numbers are properly reported, the zoning fields on the SMP DISCOVER response may be checked 409. In one embodiment, valid zoning information causes the storage router to use the highest priority SMP zone-based mapping 410, while no zoning information yields SMP-reported slot number zoning 415.

Target-to-enclosure affinity within the storage router offers other opportunities to create a more natural user experience with bridged target devices. In another embodiment, a storage router may create virtual target devices which respond to SCSI INQUIRY or SCSI Enclosure Services commands. The virtual target fills in an inquiry response with custom data indicating that the associated LUNs are grouped into a single enclosure. RECEIVE_DIAGNOSTIC_RESULTS responses, along with other SES responses, are generated within the storage router to allow administrators to query the state and topology of storage enclosures which cannot natively respond to SES commands.

Storage routing functionality is not exclusive to externally attached storage router apparatus. In another embodiment of the invention, the storage router is a component of a SAS/SATA host bus adapter installed in an initiator workstation. In this instance the host interface connection is a high-speed interconnect such as Peripheral Component Interconnect Express (PCIe). SAS/SATA storage devices are discovered by the routing functionality within the host bus adapter driver software, and mapping affinities are stored in the workstation's nonvolatile storage.

While there has been described what is believed to be the preferred embodiment of the present invention, those skilled in the art will recognize that other and further changes and modifications may be made thereto without departing from the spirit or scope of the invention. Therefore, the invention is not limited to the specific details and representative embodiments shown and described herein and may be embodied in other specific forms. The present embodiments are therefore to be considered as illustrative and not restrictive, the scope of the invention being indicated by the appended claims rather than by the foregoing description, and all changes, alternatives, modifications and embodiments which come within the meaning and range of the equivalency of the claims are therefore intended to be embraced therein. In addition, the terminology and phraseology used herein is for purposes of description and should not be regarded as limiting.

The invention claimed is:

1. A storage router communicatively connectable to a plurality of target storage devices having a physical layout, comprising:
   a router discovery module configured to discover the physical layout of said target storage devices;
   a host system interface for receiving and responding to data storage commands;
   a SAS/SATA interface for communicating with said plurality of target storage devices; and
   a plurality of host system interface to target storage device maps corresponding to said physical layout of said target storage devices.

2. The storage router of claim 1, wherein said target storage devices are contained in a plurality of storage enclosures, and said storage enclosures are configured to report an enclosure identifier and to report said physical layout by means of an associated characteristic parameter.

3. The storage router of claim 2, wherein said host system interface to target storage device maps are grouped by said enclosure identifier and ordered by said associated characteristic parameter.

4. The storage router of claim 2, wherein said associated characteristic parameter is: target device slot number or target PHY identifier.

5. The storage router of claim 2, further comprising an empty target device map to account for one or more gaps in said associated characteristic parameter.

6. The storage router of claim 2, wherein at least one of said storage enclosures comprises a SCSI processor device configured to respond to a SCSI RECEIVE_DIAGNOSTIC_RESULTS command with a list of PHY identifiers, wherein characteristic parameter is target PHY identifier.

7. The storage router of claim 1, wherein said storage router is a component of a SAS/SATA host bus adapter installed in an initiator workstation.

8. The storage router of claim 1, wherein said host system interface to target storage device maps are stored in nonvolatile storage.

9. A storage router system comprising the storage router of claim 1 and a plurality of target storage devices.

10. A storage router communicatively connectable to a plurality of target storage devices having a physical layout, comprising:
 a host system interface for receiving and responding to data storage commands;
 a SAS/SATA interface for communicating with said plurality of target storage devices;
 a plurality of host system interface to target storage device maps;
 wherein said target storage devices are configured with SMP-based zone identifiers; and
 said storage router is configured to discover said zone identifiers and said physical layout of said target storage devices,
 to create a virtual enclosure for each discovered zone identifier with a corresponding virtual enclosure identifier, and
 to create said target device maps corresponding to said physical layout and said zone identifiers.

11. The storage router of claim 10, wherein said target device maps, zone identifiers and virtual enclosure identifiers are stored in nonvolatile storage.

12. The storage router of claim 10, wherein said target storage devices are contained in a plurality of storage enclosures, and said storage enclosures are configured to report SMP-based zone identifiers and to report said physical layout by means of an associated characteristic parameter.

13. The storage router of claim 12, wherein said host system interface to target storage device maps are grouped by said virtual enclosure identifiers and ordered by said associated characteristic parameter.

14. The storage router of claim 12, wherein said associated characteristic parameter is: target device slot number or target PHY identifier.

15. The storage router of claim 12, further comprising an empty target device map to account for one or more gaps in said associated characteristic parameter.

16. The storage router of claim 11, wherein at least one of said storage enclosures comprises a SCSI processor device capable of responding to a SCSI RECEIVE_DIAGNOSTIC_RESULTS command with a list of PHY identifiers, wherein said characteristic parameter is said PHY identifier.

17. The storage router of claim 10, wherein said storage router is a component of a SAS/SATA host bus adapter installed in an initiator workstation.

18. A storage router system comprising the storage router of claim 10 and a plurality of target storage devices.

19. A method of mapping target storage devices in a storage router system comprising:
 providing a host system interface for receiving and responding to data storage commands;
 providing a plurality of target storage devices;
 discovering the physical layout of said target storage devices; and
 creating a plurality of host system interface to target storage device maps corresponding to said physical layout of said target storage devices.

20. The method of claim 19, further comprising:
 providing nonvolatile storage; and
 writing said host system interface to target storage device maps to said nonvolatile storage.

21. The method of claim 19, further comprising:
 providing a plurality of storage enclosures configured to report an enclosure identifier and to report said physical layout by means of an associated characteristic parameter;
 querying said storage enclosures to report said enclosure identifier and said characteristic parameter;
 wherein said storage host system interface to target device maps are grouped by said enclosure identifier and said characteristic parameter.

22. The method of claim 21, wherein said characteristic parameter is: target device slot number or target PHY identifier.

23. The method of claim 19, further comprising:
 analyzing said characteristic parameter for gaps in order; and
 creating an empty storage device map to account for said gaps.

24. A storage router communicatively connectable to a plurality of target storage devices having a physical layout, comprising:
 a router discovery module configured to discover the physical layout of said target storage devices;
 a host system interface for receiving and responding to data storage commands;
 a PCI express interface for communicating with said plurality of target storage devices; and
 a plurality of host system interface to target storage device maps corresponding to said physical layout of said target storage devices.

25. The storage router of claim 24, wherein said target storage devices are contained in a plurality of storage enclosures, and said storage enclosures are configured to report an enclosure identifier and to report said physical layout by means of a target device slot number.

26. The storage router of claim 24, wherein said target storage device maps are grouped by said storage enclosure identifier and ordered by said target device slot number.

27. The storage router of claim 24, further comprising an empty target device map to account for one or more gaps in said target device slot number.

28. The storage router of claim 24, wherein said target storage device maps are stored in nonvolatile storage.

* * * * *